United States Patent
Inoue et al.

(10) Patent No.: US 11,136,925 B2
(45) Date of Patent: Oct. 5, 2021

(54) DEVICE AND METHOD FOR CONTROLLING ENGINE

(71) Applicant: Mazda Motor Corporation, Hiroshima (JP)

(72) Inventors: Atsushi Inoue, Aki-gun (JP); Yusuke Kawai, Hiroshima (JP); Tetsuya Chikada, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 35 days.

(21) Appl. No.: 16/783,399

(22) Filed: Feb. 6, 2020

(65) Prior Publication Data

US 2020/0332728 A1 Oct. 22, 2020

(30) Foreign Application Priority Data

Apr. 22, 2019 (JP) .............................. JP2019-081019

(51) Int. Cl.
*F02D 13/02* (2006.01)
*F02B 33/40* (2006.01)

(52) U.S. Cl.
CPC .......... *F02D 13/0215* (2013.01); *F02B 33/40* (2013.01); *F02D 2200/101* (2013.01)

(58) Field of Classification Search
CPC . F02D 13/0215; F02B 33/40; F02B 2200/101

USPC ....................................................... 123/90.15
See application file for complete search history.

(56) References Cited

FOREIGN PATENT DOCUMENTS

| CN | 109931169 A | * | 6/2019 | ......... F02D 41/0062 |
|---|---|---|---|---|
| JP | 2018159271 A | * | 10/2018 | .............. F02B 33/38 |
| JP | 2018159271 A |   | 10/2018 |   |
| JP | 2020176596 A | * | 10/2020 | .............. F02B 33/38 |

* cited by examiner

*Primary Examiner* — J. Todd Newton, Esq.
(74) *Attorney, Agent, or Firm* — Alleman Hall Creasman & Tuttle LLP

(57) ABSTRACT

A control device for an engine is provided, which includes variable intake and exhaust valve operating mechanisms, a supercharger provided to an intake passage and configured to boost intake air introduced into a cylinder, and a controller. The controller drives the supercharger when the engine operates in a boosted range. The controller controls the variable intake and exhaust valve operating mechanisms so that a valve overlap period during which intake and exhaust valves open simultaneously is formed, when the engine operates in a low-speed boosted range of the boosted range where the engine speed is less than a reference speed. The controller controls the variable exhaust valve operating mechanism so that the open timing of the exhaust valve is more advanced when the engine operates in a high-speed boosted range of the boosted range where the engine speed is greater than or equal to the reference speed.

10 Claims, 9 Drawing Sheets

DEVICE AND METHOD FOR CONTROLLING ENGINE

TECHNICAL FIELD

The present disclosure relates to a device and a method for controlling an engine.

BACKGROUND OF THE DISCLOSURE

In an engine provided to a vehicle, etc., a supercharger which boosts intake air introduced into a cylinder may be provided to an intake passage in order to meet requirements, such as an improvement in output. For example, JP2018-159271A discloses an engine provided with an electric supercharger. In this engine, a valve overlap period during which both an intake valve and an exhaust valve open is established during boosting by the supercharger to improve the scavenging performance, thereby introducing a large amount of air into the cylinder.

The engine provided to a vehicle, etc. requires an increase in a compression ratio of a cylinder for the purpose of improving fuel efficiency, etc. However, if the compression ratio of the cylinder is increased, there is a possibility that a premature ignition in which the temperature of a mixture gas becomes excessively high during compression and the mixture gas ignites earlier than a desired timing may occur. On the other hand, for example, by utilizing the configuration of JP2018-159271A, if the valve overlap period during which both the intake valve and the exhaust valve open is extended, it is thought that most of the hot burned gas which remains inside the cylinder can be discharged from the cylinder, and thereby, the increase in the temperature of the mixture gas can be suppressed. However, if the valve overlap period is simply extended, the open timing of the exhaust valve will be delayed and pumping loss will increase.

SUMMARY OF THE DISCLOSURE

The present disclosure is made in view of the above situations, and one purpose thereof is to provide a device and a method for controlling an engine, capable of improving fuel efficiency, while preventing a premature ignition.

According to one aspect of the present disclosure, a control device for an engine is provided. The engine includes a cylinder, an intake passage, an exhaust passage, an intake port communicating the intake passage with the cylinder, an intake valve configured to open and close the intake port, an exhaust port communicating the exhaust passage with the cylinder, and an exhaust valve configured to open and close the exhaust port. The control device includes a variable intake valve operating mechanism configured to change an open timing and a close timing of the intake valve while maintaining an open period of the intake valve constant, a variable exhaust valve operating mechanism configured to change an open timing and a close timing of the exhaust valve while maintaining an open period of the exhaust valve constant, a supercharger provided to the intake passage and configured to boost intake air introduced into the cylinder, and a controller including a processor, configured to control the variable intake valve operating mechanism and the variable exhaust valve operating mechanism. The controller drives the supercharger when an operation point of the engine is in a boosted range included in an operating range defined by a combination of an engine speed and an engine load. The controller controls the variable intake valve operating mechanism and the variable exhaust valve operating mechanism so that a valve overlap period that is a period during which the intake valve and the exhaust valve open simultaneously is formed, when the operation point is in a low-speed boosted range of the boosted range where the engine speed is less than a reference speed. The controller controls the variable exhaust valve operating mechanism so that the open timing of the exhaust valve is advanced more when the operation point is in a high-speed boosted range of the boosted range where the engine speed is greater than or equal to the reference speed, than when the operation point is in the low-speed boosted range.

According to this configuration, the pumping loss can be reduced and fuel efficiency can be improved, while preventing a premature ignition and appropriately combusting the mixture gas.

In detail, when the engine speed is low, the period of time during which the temperature of the mixture gas is high (i.e., heat-receiving time) becomes longer during a compression stroke, and thus, it becomes easier for the premature ignition in which the mixture gas self-ignites at a timing earlier than a desired timing to occur. On the other hand, according to this configuration, when the engine is operated in the low-speed boosted range where the engine speed is low which is in the boosted range where the boost is performed by the supercharger, while the valve overlap period during which both the intake valve and the exhaust valve open is formed, the open timing of the exhaust valve is retarded more than when the engine is operated in the high-speed boosted range where the engine speed is high, and the valve overlap period is extended. Therefore, the scavenging performance is increased so that a larger amount of hot burnt gas can be discharged from the cylinder, and thus, the temperature inside the cylinder can be reduced. As a result, the premature ignition can be certainly prevented, and the mixture gas can be appropriately combusted.

On the other hand, in the high-speed boosted range where the engine speed is high and the heat-receiving time is short, and therefore, it is difficult for the premature ignition to occur, the open timing of the exhaust valve is advanced so that the exhaust gas can be discharged from the cylinder at an early timing. Thus, the pumping loss which is a work of the piston required for discharging the exhaust gas can be reduced, and fuel efficiency can be improved.

The supercharger may be a mechanical supercharger configured to be driven by an output shaft of the engine and boost intake air.

According to this configuration, compared to using a turbocharger which has a turbine in the exhaust passage, the pressure inside the exhaust passage during the driving of the supercharger is reduced, and a pressure difference between the intake passage and the exhaust passage is increased so that the scavenging performance can be increased.

When the operation point is in the high-speed boosted range, the controller may control the variable exhaust valve operating mechanism so that the open timing of the exhaust valve is maintained constant even when the engine speed changes.

According to this configuration, the opportunity of driving the variable exhaust valve operating mechanism can be reduced. Moreover, in the high-speed boosted range, the open timing of the exhaust valve can avoid being excessively retarded in connection with the change in the engine speed.

When the operation point is in the high-speed boosted range, the controller may control the variable intake valve operating mechanism and the variable exhaust valve operating mechanism so that the valve overlap period is formed.

According to this configuration, the scavenging performance can be secured also in the high-speed boosted range, and thus, a large amount of air can be introduced into the cylinder.

When the operation point is in the low-speed boosted range, the controller may control the variable exhaust valve operating mechanism so that the open timing of the exhaust valve is maintained constant even when the engine speed changes.

According to also this configuration, the opportunity of driving the variable exhaust valve operating mechanism can be reduced. Moreover, in the low-speed boosted range, the open timing of the exhaust valve can avoid being excessively advanced in connection with the change in the engine speed.

According to another aspect of the present disclosure, a method of controlling an engine is provided. The engine includes a cylinder, an intake passage, an exhaust passage, an intake port communicating the intake passage with the cylinder, an intake valve configured to open and close the intake port, an exhaust port communicating the exhaust passage with the cylinder, an exhaust valve configured to open and close the exhaust port, a variable intake valve operating mechanism configured to change an open timing and a close timing of the intake valve while maintaining an open period of the intake valve constant, a variable exhaust valve operating mechanism configured to change an open timing and a close timing of the exhaust valve while maintaining an open period of the exhaust valve constant, and a supercharger provided to the intake passage and configured to boost intake air introduced into the cylinder. The method includes the steps of driving the supercharger to boost intake air when an operation point of the engine is in a boosted range included in an operating range defined by a combination of an engine speed and an engine load, driving the variable intake valve operating mechanism and the variable exhaust valve operating mechanism so that a valve overlap period that is a period during which the intake valve and the exhaust valve open simultaneously is formed, when the operation point is in a low-speed boosted range of the boosted range where the engine speed is less than a reference speed, and driving the variable exhaust valve operating mechanism so that an open timing of the exhaust valve is advanced more when the operation point is in a high-speed boosted range of the boosted range where the engine speed is greater than or equal to the reference speed, than when the operation point is in the low-speed boosted range.

According to this configuration, similar to the configuration described above, pumping loss can be reduced and fuel efficiency can be improved, while preventing premature ignition and appropriately combusting the mixture gas.

The supercharger may be a mechanical supercharger configured to be driven by an output shaft of the engine and boost intake air.

According to this configuration, similar to the configuration described above, the scavenging performance can be increased compared to using a turbocharger.

Driving the variable exhaust valve operating mechanism may include driving the variable exhaust valve operating mechanism so that the open timing of the exhaust valve is maintained constant even when the engine speed changes within a range where the engine speed is greater than or equal to the reference speed.

According to this configuration, similar to the configuration described above, the opportunity of driving the variable exhaust valve operating mechanism can be reduced. Moreover, in the high-speed boosted range, the open timing of the exhaust valve can avoid being excessively retarded.

Driving the variable exhaust valve operating mechanism may include driving the variable intake valve operating mechanism and the variable exhaust valve operating mechanism so that the valve overlap period is formed.

According to this configuration, similar to the configuration described above, the scavenging performance is secured also in the high-speed boosted range, and a large amount of air can be introduced into the cylinder.

Driving the variable intake valve operating mechanism and the variable exhaust valve operating mechanism may include driving the variable exhaust valve operating mechanism so that the open timing of the exhaust valve is maintained constant even when the engine speed changes within a range where the engine speed is less than the reference speed.

According to this configuration, similar to the configuration described above, the opportunity of driving the variable intake valve operating mechanism and the variable exhaust valve operating mechanism can be reduced. Moreover, in the low-speed boosted range, the open timing of the exhaust valve can avoid being excessively advanced.

DETAILED DESCRIPTION OF THE DISCLOSURE (1) Overall Configuration of the Engine

Figure 1:
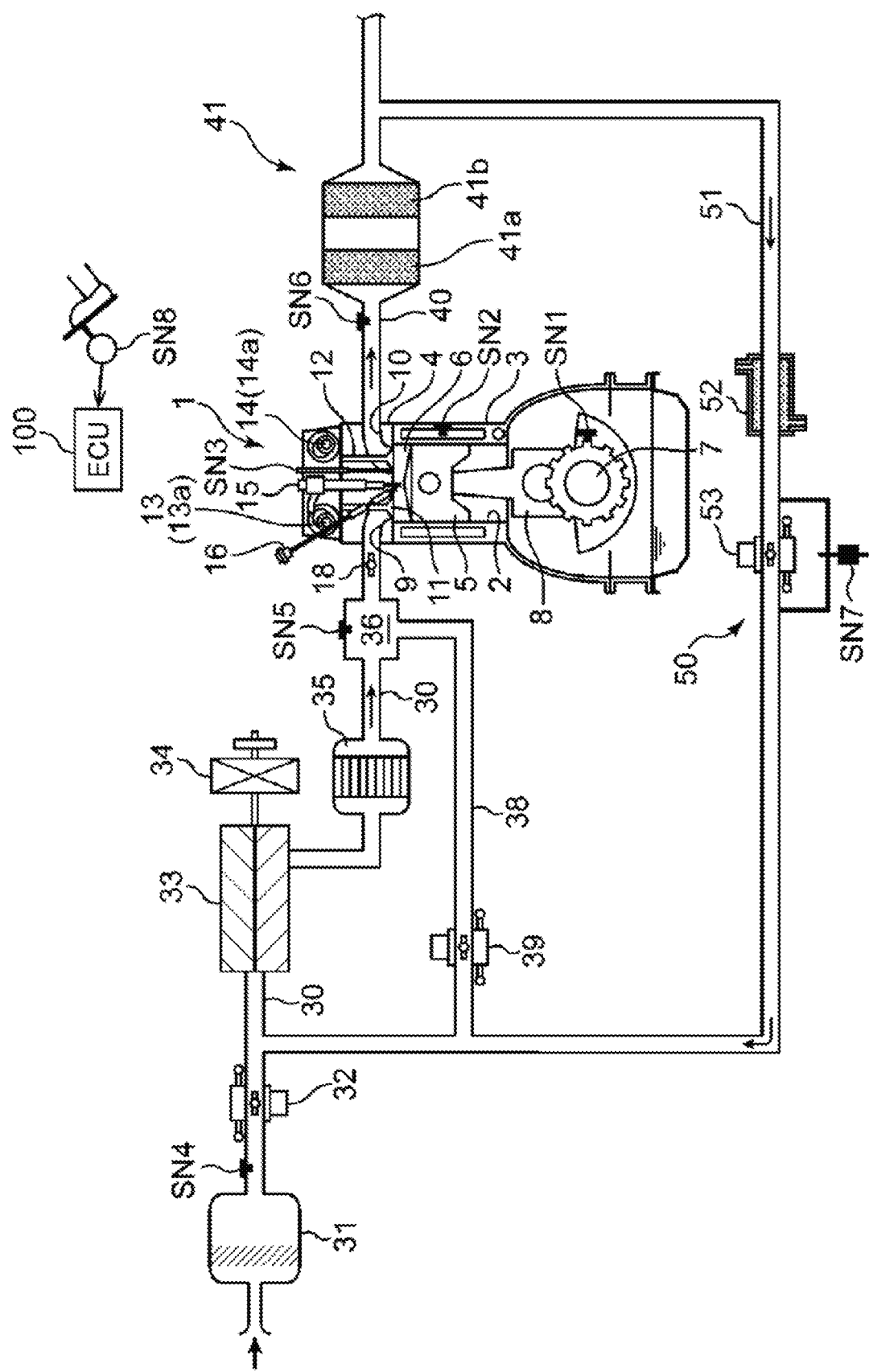
FIG. 1 is a system diagram schematically illustrating the overall configuration of an engine according to one embodiment of the present disclosure.

FIG. 1 is a system diagram schematically illustrating the overall configuration of an engine to which a control device and a control method of the present disclosure are applied. The engine system illustrated in this figure is mounted on a vehicle, and provided with an engine body 1 as a propelling source. In this embodiment, a four-cycle gasoline direct-injection engine is used as the engine body 1. The engine system includes, in addition to the engine body 1, an intake passage 30 where intake air introduced into the engine body 1 circulates, an exhaust passage 40 where exhaust gas discharged from the engine body 1 circulates, and an exhaust gas recirculation (EGR) device 50 which recirculates to the intake passage 30 a portion of the exhaust gas flowing through the exhaust passage 40.

The engine body 1 has a cylinder block 3 where cylinders 2 are formed therein, a cylinder head 4 attached to an upper surface of the cylinder block 3 so as to cover up the cylinders 2 from above, and pistons 5 inserted in the respective cylinder 2 so as to reciprocate. Although the engine body 1 is, typically, a multi-cylinder type having a plurality of cylinders 2 (e.g., four cylinders 2 lined up in a direction perpendicular to the drawing of FIG. 1), one cylinder 2 is focused here for simplifying the description.

A combustion chamber 6 is defined above the piston 5, and fuel comprised of gasoline as its main component is supplied to the combustion chamber 6 by an injection from an injector 15 (described later). Then, the supplied fuel combusts while being mixed with air inside the combustion chamber 6, and the piston 5 depressed by an expansive force produced by the combustion reciprocates in the vertical direction. Note that the fuel injected into the combustion chamber 6 is fuel which contains gasoline as the main component. This fuel may also contain a secondary component, such as bioethanol, in addition to gasoline.

Below the piston 5, a crankshaft 7 which is an output shaft of the engine body 1 is provided. The crankshaft 7 is coupled to the piston 5 through a connecting rod 8, and is rotated on its center axis in connection with the reciprocating motion (vertical motion) of the piston 5.

A geometric compression ratio of the cylinder 2, i.e., a ratio of a volume of a combustion chamber 6 when the piston 5 is located at a bottom dead center to a volume of the combustion chamber 6 when the piston 5 is located at a top dead center is set as 13:1 or higher and 30:1 or lower, as a suitable value for SPCCI combustion (partial compression ignition combustion) described later.

The cylinder block 3 is provided with a crank angle sensor SN1 which detects a rotation angle of the crankshaft 7 (crank angle) and a rotational speed of the crankshaft 7 (engine speed). Moreover, the cylinder block 3 is provided with an engine water temperature sensor SN2 which detects the temperature of engine coolant (herein, suitably referred to as the "engine water temperature") which circulates through a water jacket formed in the cylinder block 3 and cools the engine body 1.

The cylinder head 4 is provided with intake ports 9 and exhaust ports 10 which open to the combustion chamber 6, intake valves 11 which open and close the intake ports 9, and exhaust valves 12 which open and close the exhaust ports 10. Note that the valve type of the engine in this embodiment is four-valve type comprised of two intake valves and two exhaust valves, and two intake ports 9, two exhaust ports 10, two intake valves 11, and two exhaust valves 12 are provided to each cylinder 2. In this embodiment, a swirl valve 18 which can be opened and closed is provided to one of the two intake ports 9 connected to one cylinder 2, and the intensity of the swirl flow (a revolving flow which circles around the cylinder axis) inside the cylinder 2 is changed.

The intake valve 11 and the exhaust valve 12 are opened and closed by respective valve operating mechanisms 13 and 14 including a pair of cam shafts disposed in the cylinder head 4 in an interlocked manner with the rotation of the crankshaft 7.

A variable intake valve operating mechanism 13a which is capable of changing an open timing of the intake valve 11 (IVO) and a close timing of the intake valve 11 (IVC) is built in the valve operating mechanism 13. Similarly, a variable exhaust valve operating mechanism 14a which is capable of changing an open timing of the exhaust valve 12 (EVO) and a close timing of the exhaust valve 12 (EVC) is built in the valve operating mechanism 14. The variable intake valve operating mechanism 13a is a variable valve operating mechanism of a phase type which simultaneously changes the open timing IVO and the close timing IVC of the intake valve 11 in a state where an open period of the intake valve 11 is fixed. Similarly, the variable exhaust valve operating mechanism 14a is a variable valve operating mechanism of the phase type which simultaneously changes the open timing EVO and the close timing EVC of the exhaust valve 12 in a state where an open period of the exhaust valve 12 is fixed.

Figure 2:
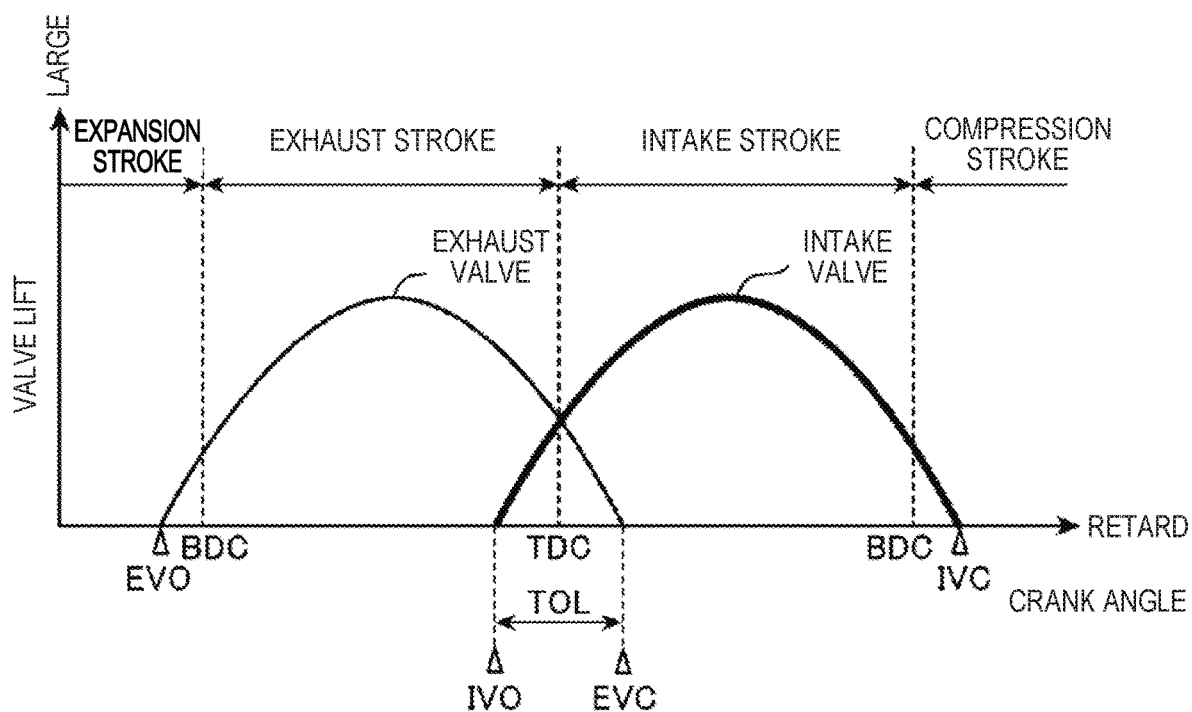
FIG. 2 is a graph illustrating valve lifts of an intake valve and an exhaust valve.

In this embodiment, as illustrated in FIG. 2, by the control of the variable intake valve operating mechanism 13a and the variable exhaust valve operating mechanism 14a, the close timing EVC of the exhaust valve 12 is retarded further than the open timing IVO of the intake valve 11 so that a valve overlap in which both the intake valve 11 and the exhaust valve 12 are opened for a given period of time is realized. That is, a valve overlap period TOL in which the intake valve 11 and the exhaust valve 12 are opened is formed. Moreover, by the control of the variable intake valve operating mechanism 13a and the variable exhaust valve operating mechanism 14a, the valve overlap period TOL in which both the intake valve 11 and the exhaust valve 12 are opened is changed.

The cylinder head 4 is provided with the injector 15 which injects fuel (mainly gasoline) into the combustion chamber 6, and an ignition plug 16 which ignites the mixture gas comprised of the fuel injected into the combustion chamber 6 from the injector 15 and air introduced into the combustion chamber 6. The cylinder head 4 is also provided with an in-cylinder pressure sensor SN3 which detects an in-cylinder pressure which is the pressure inside the combustion chamber 6.

The injector 15 is an injector of a multiple injection hole type having a plurality of injection holes at a tip-end part thereof, and is capable of injecting fuel radially from the plurality of injection holes. The injector 15 is provided so that the tip-end part thereof opposes to a central part of a crown surface of the piston 5. Note that although illustration is omitted, in this embodiment, a cavity is formed in the crown surface of the piston 5, where an area including the central part is dented to the opposite side (downward) from the cylinder head 4.

The ignition plug 16 is disposed at a position slightly offset from the injector 15 to the intake side.

The intake passage 30 is connected to one side surface of the cylinder head 4 so as to communicate with the intake ports 9. Air (intake air, fresh air) taken in from an upstream end of the intake passage 30 is introduced into the combustion chamber 6 through the intake passage 30 and the intake ports 9.

The intake passage 30 is provided with an air cleaner 31 which removes foreign substances in intake air, a throttle valve 32 which can be opened and closed to adjust a flow rate of the intake air, a supercharger 33 which pumps the intake air while compressing the intake air, an intercooler 35 which cools the intake air compressed by the supercharger 33, and a surge tank 36, in this order from the upstream side.

An airflow sensor SN4 which detects a flow rate of intake air (intake air amount), and an intake air temperature sensor SN5 which detects the temperature of the intake air (intake air temperature) are provided to respective parts of the intake passage 30. The airflow sensor SN4 is provided to a part of the intake passage 30 between the air cleaner 31 and the throttle valve 32, and detects the flow rate of intake air which passes through this part. The intake air temperature sensor SN5 is provided to the surge tank 36, and detects the temperature of intake air inside the surge tank 36.

The supercharger 33 is a mechanical supercharger which is mechanically coupled to the crankshaft 7 which is the output shaft of the engine body 1, and is rotary driven by the crankshaft 7. Although the type of the supercharger 33 may be any type, and, for example, any one of known superchargers, such as a Lysholm type, a Root type, and a centrifugal type, may be used as the supercharger 33. Between the supercharger 33 and the engine body 1, an electromagnetic clutch 34 which is capable of electrically switching between engage and disengage is provided. When the electromagnetic clutch 34 is engaged, a driving force is transmitted to the supercharger 33 from the engine body 1, and boosting of the supercharger 33 is performed. On the other hand, when the electromagnetic clutch 34 is disengaged, the transmission of the driving force is intercepted, and the boosting of the supercharger 33 is suspended.

A bypass passage 38 for bypassing the supercharger 33 is provided to the intake passage 30. The bypass passage 38 connects the surge tank 36 with an EGR passage 51 (described later). A bypass valve 39 which can be opened and closed is provided to the bypass passage 38. The bypass valve 39 is a valve for adjusting the pressure of intake air introduced into the surge tank 36 (i.e., boosting pressure). For example, as the opening of the bypass valve 39 increases, a flow rate of intake air which flows back to the upstream side of the supercharger 33 through the bypass passage 38 increases, and, as a result, the boosting pressure is lowered.

The exhaust passage 40 is connected to the other side surface of the cylinder head 4 so as to communicate with the exhaust ports 10. Burnt gas generated inside the combustion chamber 6 (exhaust gas) is discharged outside through the exhaust ports 10 and the exhaust passage 40.

A catalytic converter 41 is provided to the exhaust passage 40. A three-way catalyst 41a for purifying harmful substances (HC, CO, $NO_x$) included in exhaust gas, and a GPF (Gasoline Particulate Filter) 41b for capturing particulate matters (PM) included in exhaust gas are built inside the catalytic converter 41, in this order from the upstream side.

The exhaust passage 40 is provided with an exhaust temperature sensor SN6 which detects the temperature of exhaust gas (exhaust gas temperature). The exhaust temperature sensor SN6 is provided to a part of the exhaust passage 40 upstream of the catalytic converter 41.

An EGR device 50 has the EGR passage 51 which connects the exhaust passage 40 with the intake passage 30, and an EGR cooler 52 and an EGR valve 53 provided to the EGR passage 51. The EGR passage 51 connects a part of the exhaust passage 40 downstream of the catalytic converter 41 with a part of the intake passage 30 between the throttle valve 32 and the supercharger 33. The EGR cooler 52 cools, by a heat exchange, exhaust gas (external EGR gas) recirculated from the exhaust passage 40 to the intake passage 30 through the EGR passage 51. The EGR valve 53 is provided to the EGR passage 51 downstream of the EGR cooler 52 (closer to the intake passage 30) so as to be openable and closable, and adjusts a flow rate of exhaust gas which circulates the EGR passage 51.

A pressure difference sensor SN7 which detects a difference between the pressure upstream of the EGR valve 53 and the pressure downstream of the EGR valve 53 is provided to the EGR passage 51.

(2) Control System

Figure 3:
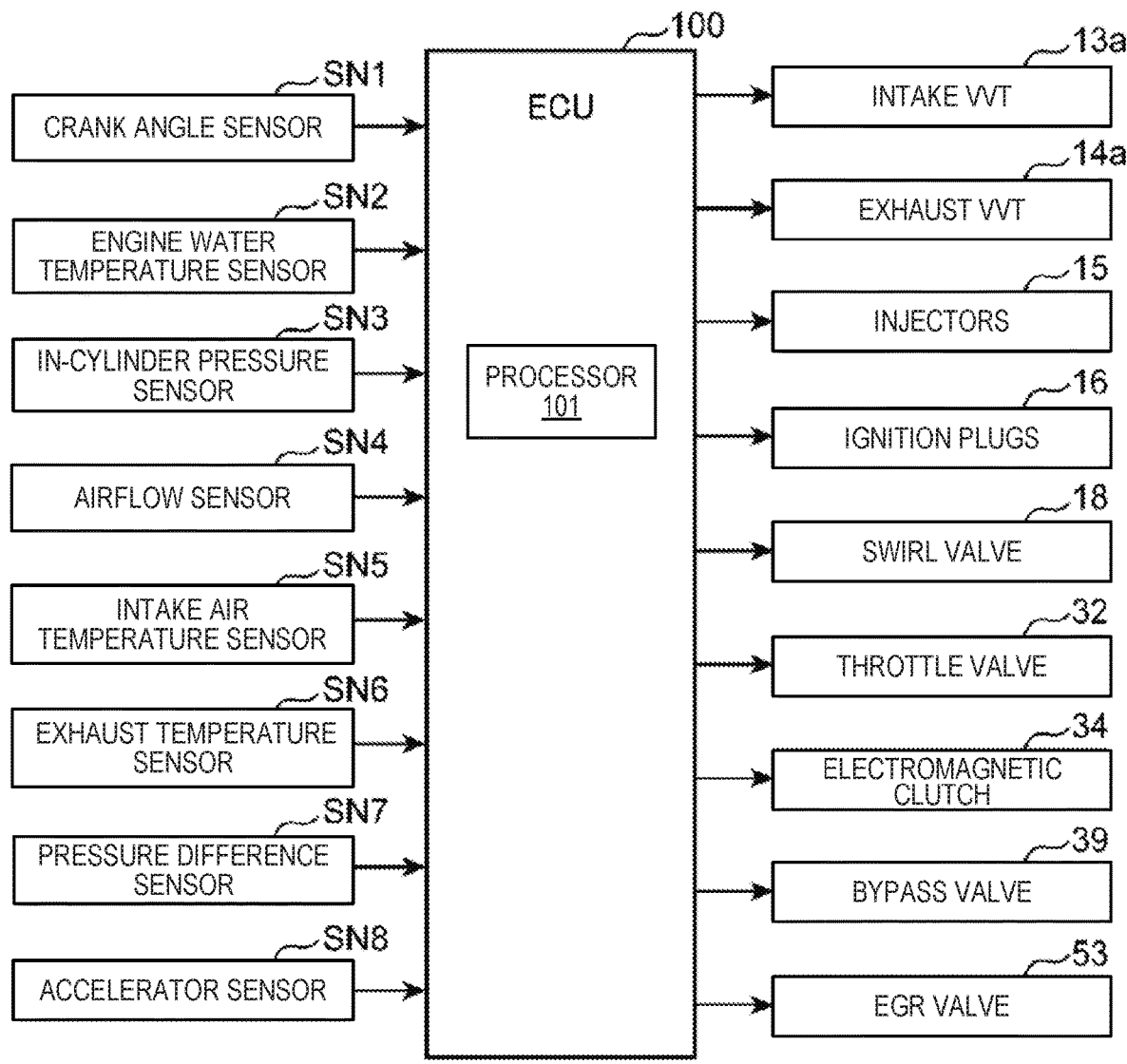
FIG. 3 is a block diagram illustrating a control system of the engine.

FIG. 3 is a block diagram illustrating a control system of the engine. An ECU (engine control unit) 100 illustrated in this figure is a microcomputer for comprehensively controlling the engine, and is comprised of a processor 101 (e.g., a central processing unit (CPU)) having associated memory comprised of ROM and/or RAM, which are well known in the art.

Detection signals of various sensors are inputted into the ECU 100. For example, the ECU 100 is electrically connected to the crank angle sensor SN1, the engine water temperature sensor SN2, the in-cylinder pressure sensor SN3, the airflow sensor SN4, the intake air temperature sensor SN5, the exhaust temperature sensor SN6, and the pressure difference sensor SN7, which are described above. Information detected by these sensors (i.e., a crank angle, an engine speed, an engine water temperature, an in-cylinder pressure, an intake air amount, an intake air temperature, an exhaust air temperature, and a pressure difference between locations before and after the EGR valve 53) are sequentially inputted into the ECU 100. Moreover, an accelerator sensor SN8 which detects an opening of an accelerator pedal operated by a driver who operates the vehicle is provided to the vehicle. A detection signal of the accelerator sensor SN8 is also inputted into the ECU 100.

The ECU 100 controls each part of the engine, while performing various determinations, calculations, etc. based on the input signals from the sensors. That is, the ECU 100 is electrically connected to the variable intake valve operating mechanism 13a, the variable exhaust valve operating mechanism 14a, the injector 15, the ignition plug 16, the swirl valve 18, the throttle valve 32, the electromagnetic clutch 34, the bypass valve 39, the EGR valve 53, etc., and outputs control signals to these devices based on the results of the calculation etc. This ECU 100 is an example of a "controller" in the present disclosure.

(3) Basic Control

Figure 4:
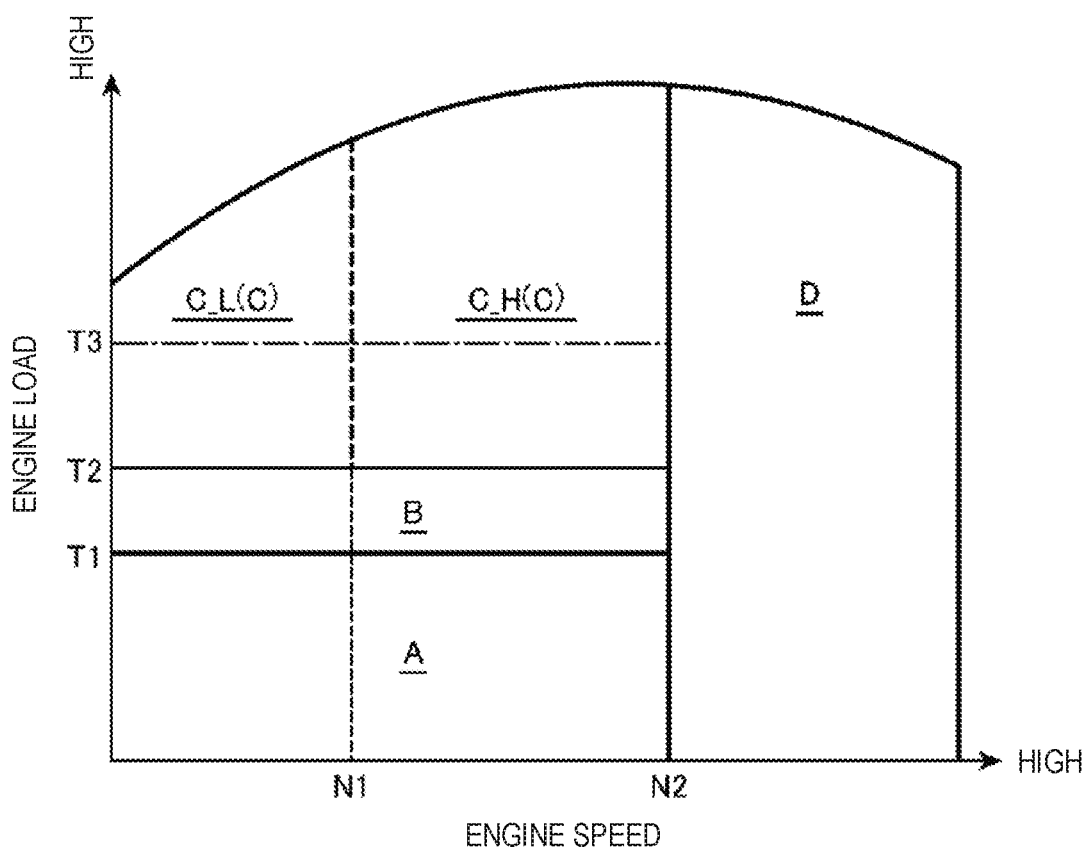
FIG. 4 is a map illustrating an engine operating range.

FIG. 4 is a map illustrating a difference of an operation mode according to the engine speed and the engine load. As illustrated in this figure, an engine operating range is roughly divided into four operating ranges, a first operating range A, a second operating range B, a third operating range C, and a fourth operating range D.

The fourth operating range D is a range where the engine speed is greater than or equal to an SI executing speed N2. The first operating range A is a range where the engine load is less than a first load T1 in the range where the engine speed is less than the SI executing speed N2. The second operating range B is a range where the engine load is greater than or equal to the first load T1 and less than a second load T2 in the range where the engine speed is less than the SI executing speed N2. The third operating range C is a range where the engine load is greater than or equal to the second load T2 in the range where the engine speed is less than the SI executing speed N2.

(3-1) SPCCI Combustion

In the first operating range A, the second operating range B, and the third operating range C, compression ignition combustion in which spark ignition (SI) combustion and compression ignition (CI) combustion are mixed (hereinafter, referred to as "SPCCI combustion") is performed. Note that "SPCCI" in SPCCI combustion is an abbreviation for "SPark Controlled Compression Ignition."

SI combustion is a combustion mode in which the mixture gas is ignited by the ignition plug 16 and the mixture gas is forcibly combusted by flame propagation which extends its combustion range from an igniting point to the perimeter. CI combustion is a combustion mode in which the mixture gas is combusted by a self-ignition under a high-temperature and high-pressure environment which is created according to compression by the piston 5. Further, SPCCI combustion in which SI combustion and CI combustion are mixed is a combustion mode in which SI combustion of a portion of the mixture gas inside the combustion chamber 6 is carried out by a jump-spark ignition which is performed under an environment just before the mixture gas self-ignites, and CI combustion of the remaining mixture gas inside the combustion chamber 6 is carried out by a self-ignition after the SI combustion (by further increase in the temperature and the pressure accompanying the SI combustion).

Figure 5:
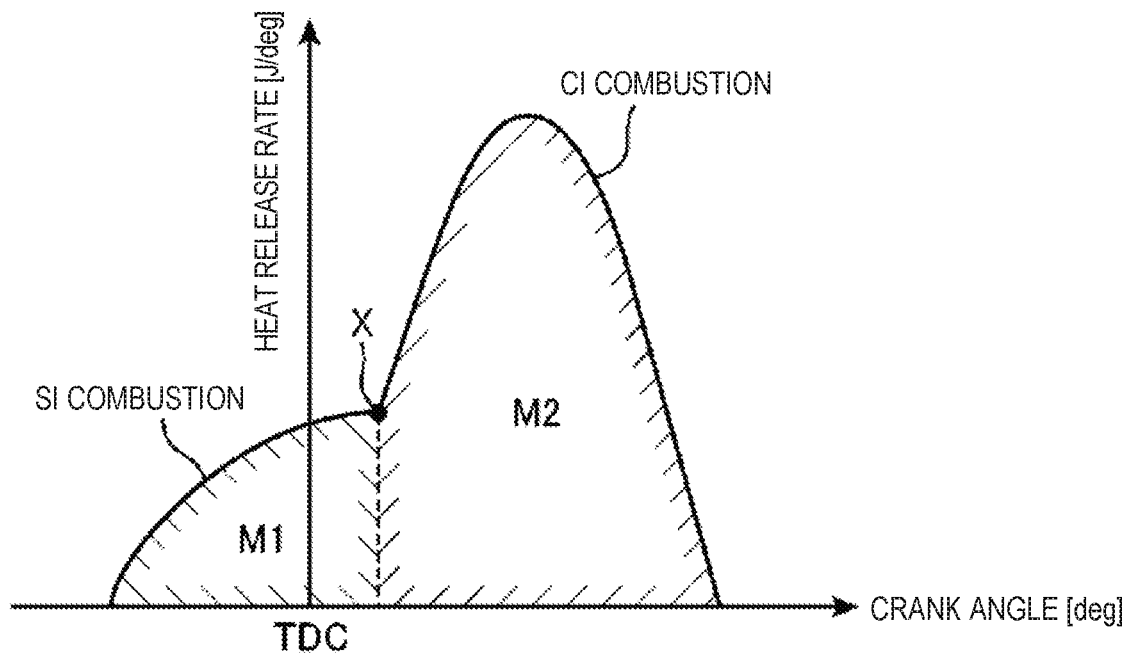
FIG. 5 is a graph illustrating a waveform of a rate of heat release during SPCCI combustion.

FIG. 5 illustrates a graph illustrating a change in the rate of heat release (J/deg) with respect to the crank angle when SPCCI combustion occurs. In SPCCI combustion, the heat release during SI combustion becomes lower than the heat release during CI combustion. For example, as for a waveform of the rate of heat release when SPCCI combustion is performed, its rising slope becomes relatively shallow, as illustrated in FIG. 5. Moreover, a pressure fluctuation in the combustion chamber 6 (i.e., dP/dθ, where P is an in-cylinder pressure and θ is a crank angle) also becomes lower during SI combustion than CI combustion. In other words, the waveform of the rate of heat release during SPCCI combustion is formed so that a first heat release rate part (a part illustrated by M1) where a rising slope formed by SI combustion is relatively shallow, and a second heat release rate part (a part illustrated by M2) where the rising slope formed by CI combustion is relatively steep, are continuous in this order.

When the temperature and the pressure inside the combustion chamber 6 are increased by SI combustion, unburnt mixture gas self-ignites in connection with this, and, therefore, CI combustion takes place. As illustrated in FIG. 5, the slope of the waveform of the rate of heat release changes from shallow to steep at the timing of this self-ignition (i.e., the timing at which CI combustion starts). That is, the waveform of the rate of heat release during SPCCI combustion has a point of inflection (indicated by "X" in FIG. 5) which appears at a timing where CI combustion starts.

After the start of CI combustion, SI combustion and CI combustion are performed in parallel. In CI combustion, since the heat release is steeper than that of SI combustion, the rate of heat release becomes relatively steep. However, since CI combustion is performed after a compression top dead center, the slope of the waveform of the rate of heat release will not become excessive. That is, since the motoring pressure falls by the descent of the piston 5 after the compression top dead center, this suppresses the rise of the rate of heat release, and, as a result, dP/dθ can avoid becoming excessive during CI combustion. Thus, in SPCCI combustion, it is difficult for dP/dθ used as the index of combustion noise to become excessive because of the nature of CI combustion being performed after SI combustion, and combustion noise can be reduced compared with simple CI combustion (when CI combustion of all the fuel is carried out).

SPCCI combustion also ends with the end of CI combustion. Since CI combustion is quicker in the combustion rate than SI combustion, it can bring the end time of the combustion earlier than the simple SI combustion (when SI combustion of all the fuel is carried out). In other words, SPCCI combustion can bring the end timing of the combustion closer to a compression top dead center within an expansion stroke. Therefore, SPCCI combustion can improve fuel efficiency compared with the simple SI combustion.

(3-2) First Operating Range

In the first operating range A, in order to improve fuel efficiency, SPCCI combustion is carried out, while an air-fuel ratio (A/F) inside the combustion chamber 6 is made higher (leaner) than a stoichiometric air-fuel ratio. For example, in the first operating range A, the air-fuel ratio inside the combustion chamber 6 is set about to 30:1.

In the first operating range A, each part of the engine is driven as follows so that the lean SPCCI combustion is realized.

Figure 6:
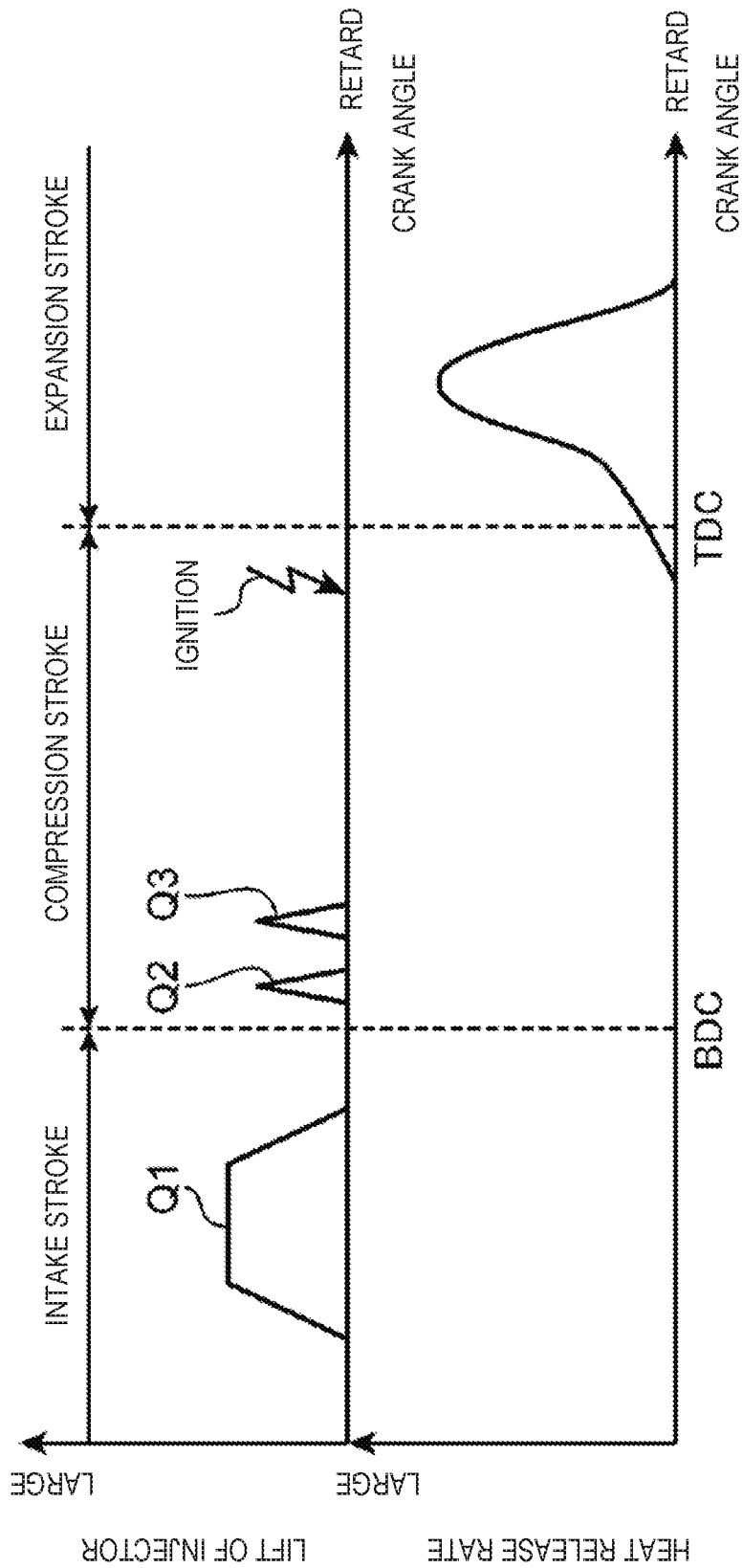
FIG. 6 is a view illustrating an injection pattern and a waveform of the rate of heat release during SPCCI combustion.

In the first operating range A, the injector 15 injects such an amount of fuel into the combustion chamber 6 that the air-fuel ratio inside the combustion chamber 6 becomes higher than the stoichiometric air-fuel ratio, as described above. In this embodiment, the injector 15 is driven so that substantially the entire amount fuel to be supplied into the combustion chamber 6 in one cycle is injected into the combustion chamber 6 during an intake stroke. For example, as illustrated in FIG. 6, in the first operating range A, a major part of the fuel is injected during an intake stroke (Q1), and the remaining fuel is injected in two stages during a compression stroke (Q2 and Q3). In the first operating range A, as illustrated in FIG. 6, the ignition plug 16 ignites the mixture gas near a compression top dead center. SPCCI combustion is started triggered by this ignition, a portion of the mixture gas inside the combustion chamber 6 combusts by flame propagation (SI combustion), and the remaining mixture gas then combusts by a self-ignition (CI combustion). Note that in order to activate the mixture gas, the ignition may be additionally performed before the ignition carried out near the compression top dead center.

In the first operating range A, the opening of the throttle valve 32 is set fully opened or near fully opened. In the first operating range A, the EGR valve 53 is fully closed so that an amount of external EGR gas introduced into the combustion chamber 6 becomes zero. In the first operating range A, the variable intake valve operating mechanism 13a and the variable exhaust valve operating mechanism 14a drive the intake valve 11 and the exhaust valve 12 so that the intake valve 11 and the exhaust valve 12 overlap with each other. In the first operating range A, the swirl valve 18 is set fully closed or near fully closed.

In the first operating range A, the driving of the supercharger 33 is suspended. That is, the electromagnetic clutch 34 is released to disconnect the supercharger 33 from the engine body 1 and the bypass valve 39 is fully opened so that the boosting by the supercharger 33 is suspended.

(3-3) Second Operating Range and Third Operating Range

In the range where the engine load is high, it becomes difficult to make the air-fuel ratio of the mixture gas lean because the amount of fuel supplied to the combustion chamber 6 is large. Therefore in the second operating range B and the third operating range C where the engine load is higher than the first operating range A, SPCCI combustion of the mixture gas is carried out, while making the air-fuel ratio inside the combustion chamber 6 near the stoichiometric air-fuel ratio. In this embodiment, in the second and third operating ranges B and C, the air-fuel ratio of the mixture gas is made substantially the stoichiometric air-fuel ratio.

Also in the second and third operating ranges B and C, the opening of the throttle valve 32 is made fully opened or near fully opened.

In the second and third operating ranges B and C, the injector 15 injects such an amount of fuel into the combustion chamber 6 that the air-fuel ratio becomes the stoichiometric air-fuel ratio as described above. In this embodiment, the injector 15 is driven so that the major part of the fuel to be injected in one cycle is injected during an intake stroke and the remaining fuel is injected during a compression stroke. Also in the second and third operating ranges B and C, the ignition plug 16 ignites the mixture gas near a compression top dead center, SPCCI combustion is started triggered by this ignition, the portion of the mixture gas inside the combustion chamber 6 combusts by flame propagation (SI combustion), and the remaining mixture gas then combusts by a self-ignition (CI combustion).

In the second and third operating ranges B and C, in order to reduce $NO_x$ generated inside the combustion chamber 6, the EGR valve 53 is opened to introduce external EGR gas into the combustion chamber 6. However, when the engine load is high, a large amount of air must be introduced into the combustion chamber 6, it is necessary to reduce the amount of external EGR gas introduced into the combustion chamber 6. Therefore, in the second and third operating ranges B and C, the opening of the EGR valve 53 is controlled so that the amount of external EGR gas introduced into the combustion chamber 6 is further reduced as the load becomes higher, and the EGR valve 53 is fully closed in a partial range of the third operating range C where the engine load becomes a maximum load.

Also in the second and third operating ranges B and C, the variable intake valve operating mechanism 13a and the variable exhaust valve operating mechanism 14a drive the intake valve 11 and the exhaust valve 12 so that the intake valve 11 and the exhaust valve 12 form the valve overlap. The details of control of the variable intake valve operating mechanism 13a and the variable exhaust valve operating mechanism 14a in the third operating range C will be described later.

In the second and third operating ranges B and C, the swirl valve 18 is opened to a suitable intermediate opening other than fully closed and fully opened, and this opening is increased as the engine load becomes higher.

In the second operating range B of the second and third operating ranges B and C where the engine load is on a low side, the supercharger 33 is suspended.

On the other hand, the supercharger 33 operates in the third operating range C on the high engine load side. That is, the electromagnetic clutch 34 is connected to couple the supercharger 33 to the engine body 1. At this time, the opening of the bypass valve 39 is controlled so that the pressure inside the surge tank 36 (boosting pressure) is in agreement with a target pressure defined beforehand for every operating condition (the engine speed and the engine load). Thus, in the third operating range C, the supercharger 33 operates to boost the intake air and SPCCI combustion is carried out, and therefore, below, the third operating range C is suitably referred to as the "boosted SPCCI range C." Moreover, in this embodiment, this boosted SPCCI range C (the third operating range C) is an example of a "boosted range" in the present disclosure.

(3-4) Fourth Operating Range

In the fourth operating range D, comparatively orthodox SI combustion is performed. In order to realize this SI combustion in the fourth operating range D, the injector 15 injects fuel over a given period of time which at least overlaps with an intake stroke. The ignition plug 16 ignites the mixture gas near a compression top dead center. In the third operating range C, SI combustion is started triggered by this ignition, and all the mixture gas inside the combustion chamber 6 combusts by flame propagation. In the fourth operating range D, the supercharger 33 operates. The throttle valve 32 is fully opened. The opening of the EGR valve 53 is controlled so that the air-fuel ratio inside the combustion chamber 6 becomes near the stoichiometric air-fuel ratio. In the fourth operating range D, the swirl valve 18 is fully opened.

(4) Control for Open and Close Timings of Intake and Exhaust Valves in Boosted SPCCI Range A control of the open and close timings of the intake valve 11 and the exhaust valve 12 which are carried out in the boosted SPCCI range C is described below.

As described above, in the boosted SPCCI range C, the variable intake valve operating mechanism 13a and the variable exhaust valve operating mechanism 14a drive the intake valve 11 and the exhaust valve 12 so that the intake valve 11 and the exhaust valve 12 overlap each other. In this embodiment, as illustrated in FIG. 2, the intake valve 11 and the exhaust valve 12 are both opened for the given period of time ranging over an exhaust top dead center (TDC). Moreover, the exhaust valve 12 is controlled to start opening at a timing on the advanced side of an expansion bottom dead center (BDC), and the intake valve 11 is controlled to be closed at the timing on the retarded side of an intake bottom dead center (BDC). Note that the open period of the intake valve 11 and the open period of the exhaust valve 12 are set as periods longer than 180° CA (crank angle). For example, both the open periods are set as 240° CA.

However, in this embodiment, in a low-speed boosted SPCCI range C_L of the boosted SPCCI range C where the engine speed is lower than a reference speed N1 set beforehand and a high-speed boosted SPCCI range C_H where the engine speed is the reference speed N1 or higher, the close timing EVC of the exhaust valve 12 and the length of the valve overlap period TOL of the intake valve 11 and the exhaust valve 12 differ. Note that in this embodiment, the low-speed boosted SPCCI range C_L is an example of a "low-speed boosted range" in the present disclosure, and the high-speed boosted SPCCI range C_H is an example of a "high-speed boosted range" in the present disclosure.

In this embodiment, the reference speed N1 is changed according to the wall temperature of the combustion chamber 6. In detail, the reference speed N1 is set as a higher value as the wall temperature of the combustion chamber 6 increases.

Figure 7:
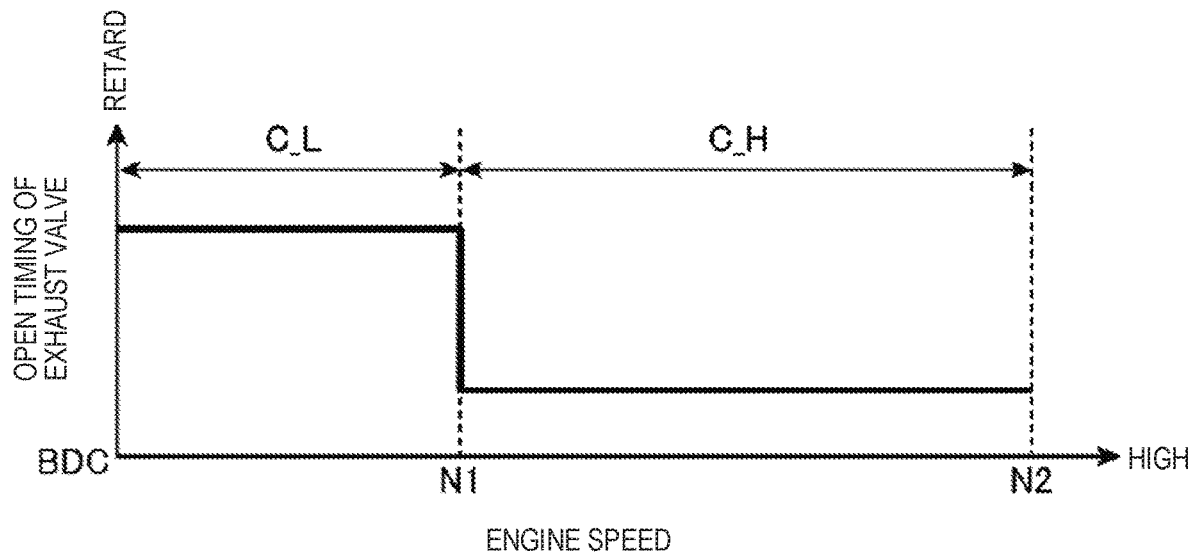
FIG. 7 is a graph illustrating a relationship between an engine speed and an open timing of the exhaust valve.
Figure 8:
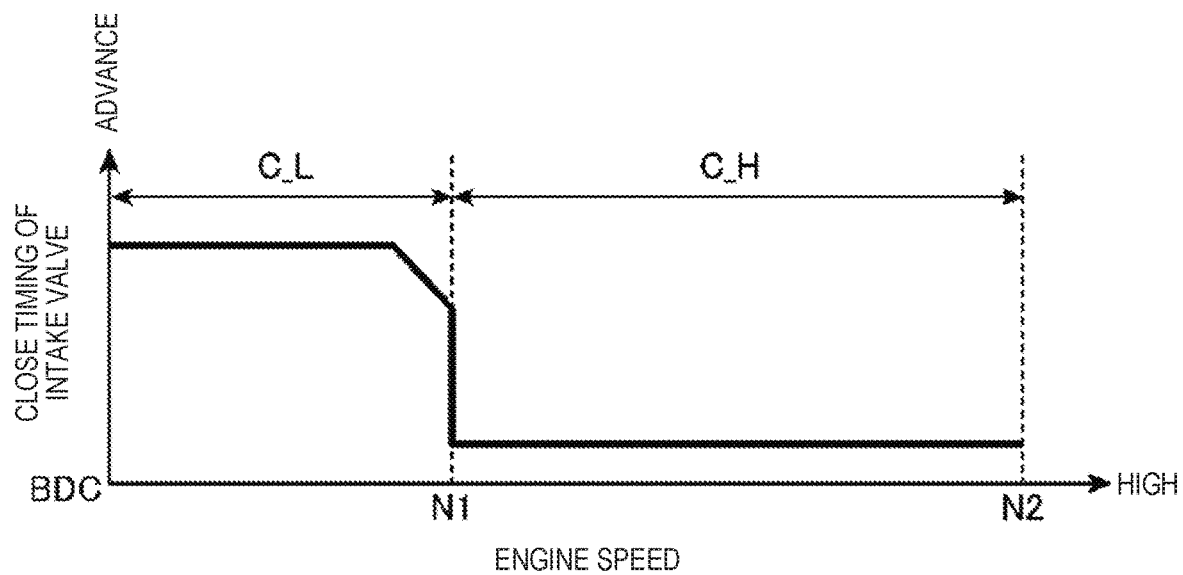
FIG. 8 is a graph illustrating a relationship between the engine speed and a close timing of the intake valve.
Figure 9:
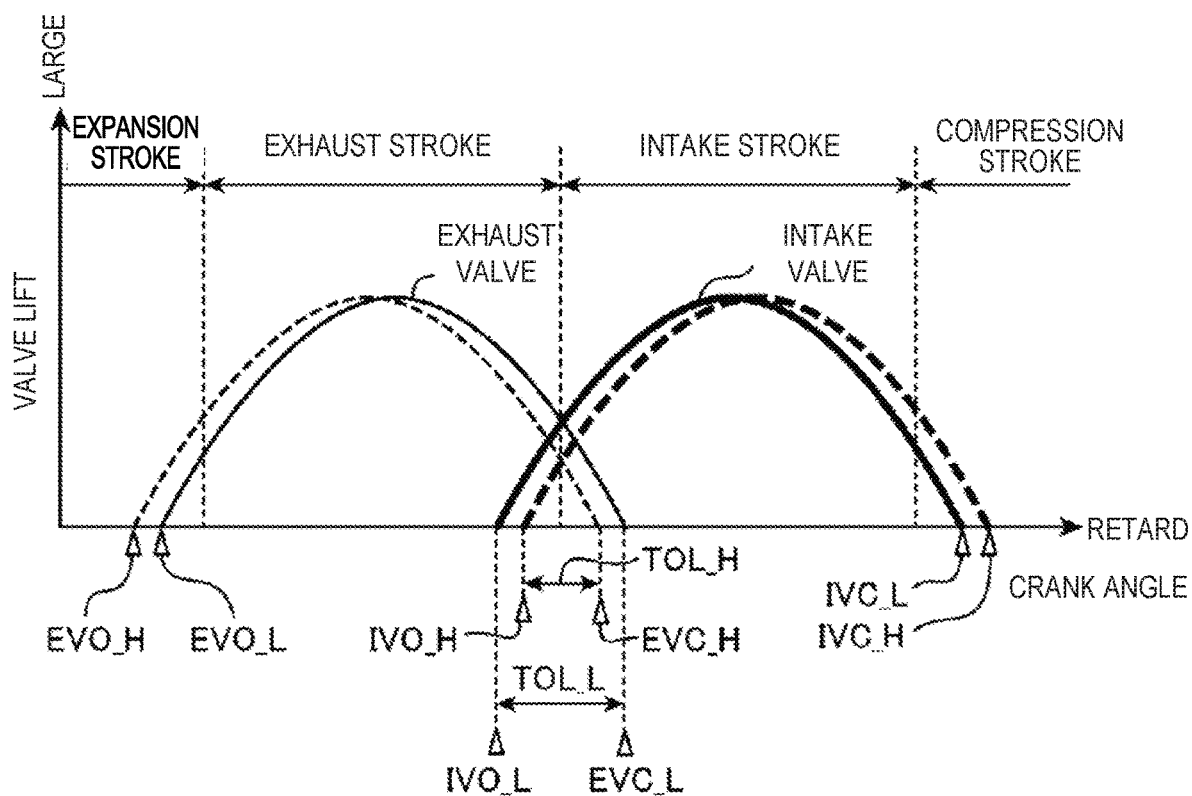
FIG. 9 is a view illustrating a comparison of a valve lift of the intake valve and the exhaust valve between a low-speed boosted SPCCI range and a high-speed boosted SPCCI range.

FIG. 7 is a graph illustrating a relationship between the engine speed and the open timing EVO of the exhaust valve 12 at a given load T3 (FIG. 4) where the engine load is included in the boosted SPCCI range C. FIG. 8 is a graph illustrating a relationship between the engine speed and the close timing IVC of the intake valve 11 at the load T3. Here, as described above, in this embodiment, the intake valve 11 and the exhaust valve 12 are changed in the open and close timings while their open periods are maintained constant, and the graph of FIG. 7 also illustrates a relationship between the engine speed and the close timing EVC of the exhaust valve 12. Similarly, the graph of FIG. 8 also illustrates a relationship between the engine speed and the open timing IVO of the intake valve 11. FIG. 9 is a view schematically illustrating a change in the valve lifts of the intake and exhaust valves 11 and 12 with respect to the crank angle. Solid lines in FIG. 9 are one example of the valve lifts of the intake and exhaust valves 11 and 12 in the low-speed boosted SPCCI range C_L, and broken lines are one example of the valve lifts of the intake and exhaust valves 11 and 12 in the high-speed boosted SPCCI range C_H.

As illustrated in FIGS. 7 and 9, the open timing EVO of the exhaust valve 12 in the high-speed boosted SPCCI range C_H (timing EVO_H in FIG. 9) is set on the advance side of the open timing EVO of the exhaust valve 12 in the low-speed boosted SPCCI range C_L (timing EVO_L in FIG. 9). For example, while the open timing EVO of the exhaust valve 12 in the low-speed boosted SPCCI range C_L is set as about 30° CA before an exhaust bottom dead center, the open timing EVO of the exhaust valve 12 in the high-speed boosted SPCCI range C_H is set as about 40° CA before an exhaust bottom dead center.

As illustrated in FIG. 7, the open timing EVO of the exhaust valve 12 in the high-speed boosted SPCCI range C_H is fixed, even if the engine speed changes. Moreover, the open timing EVO of the exhaust valve 12 in the high-speed boosted SPCCI range C_H is fixed regardless of the change in the engine load, and therefore, the open timing EVO of the exhaust valve 12 is constant throughout the high-speed boosted SPCCI range C_H.

Similarly, the open timing EVO of the exhaust valve 12 in the low-speed boosted SPCCI range C_L is also fixed, even if the engine speed and the engine load change. That is, the open timing EVO of the exhaust valve 12 is constant throughout the low-speed boosted SPCCI range C_L. Note that the terms "fixed" and "constant" as used herein refer to a timing that is exactly the same and a timing with some variation of about 4° CA.

In connection with the open timing EVO of the exhaust valve 12 being set as described above, the close timing EVC of the exhaust valve 12 in the high-speed boosted SPCCI range C_H (timing EVC_H in FIG. 9) is more advanced than the close timing EVC of the exhaust valve 12 in the low-speed boosted SPCCI range C_L (timing EVC_L in FIG. 9). Moreover, the close timing EVC of the exhaust valve 12 is fixed in the high-speed boosted SPCCI range C_H and it is fixed in the low-speed boosted SPCCI range C_L.

As illustrated in FIGS. 8 and 9, the close timing IVC of the intake valve 11 in the high-speed boosted SPCCI range C_H (timing IVC_H in FIG. 9) is more retarded than the close timing IVC of the intake valve 11 in the low-speed boosted SPCCI range C_L (timing IVC L in FIG. 9). For example, the close timing IVC of the intake valve 11 in the low-speed boosted SPCCI range C_L is set as about 20° CA after an intake bottom dead center, and the close timing IVC of the intake valve 11 in the high-speed boosted SPCCI range C_H is set as about 40° CA after an intake bottom dead center.

In connection with the close timing IVC of the intake valve 11 being set as described above, the open timing IVO of the intake valve 11 in the high-speed boosted SPCCI range C_H (timing IVO H in FIG. 9) is more retarded than the open timing IVO of the intake valve 11 in the low-speed boosted SPCCI range C_L (timing IVO_L in FIG. 9).

Figure 10:
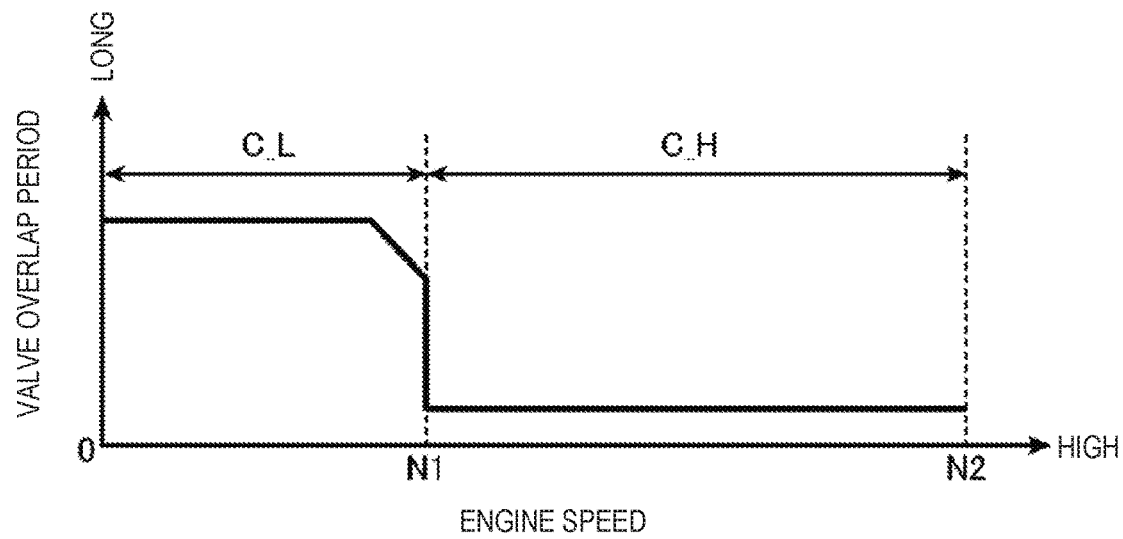
FIG. 10 is a graph illustrating a relationship between the engine speed and a valve overlap period.

By setting the open and close timings of the intake valve 11 and the exhaust valve 12 as described above, the valve overlap period TOL in the low-speed boosted SPCCI range C_L (TOL_L in FIG. 9) becomes longer than the valve overlap period TOL in the high-speed boosted SPCCI range C_H (TOL_H in FIG. 9), as illustrated in FIGS. 9 and 10. For example, the valve overlap period in the high-speed boosted SPCCI range C_H is 30° CA to 40° CA (crank angle), and the valve overlap period in the low-speed boosted SPCCI range C_L is 50° CA to 70° CA (crank angle).

Figure 11:
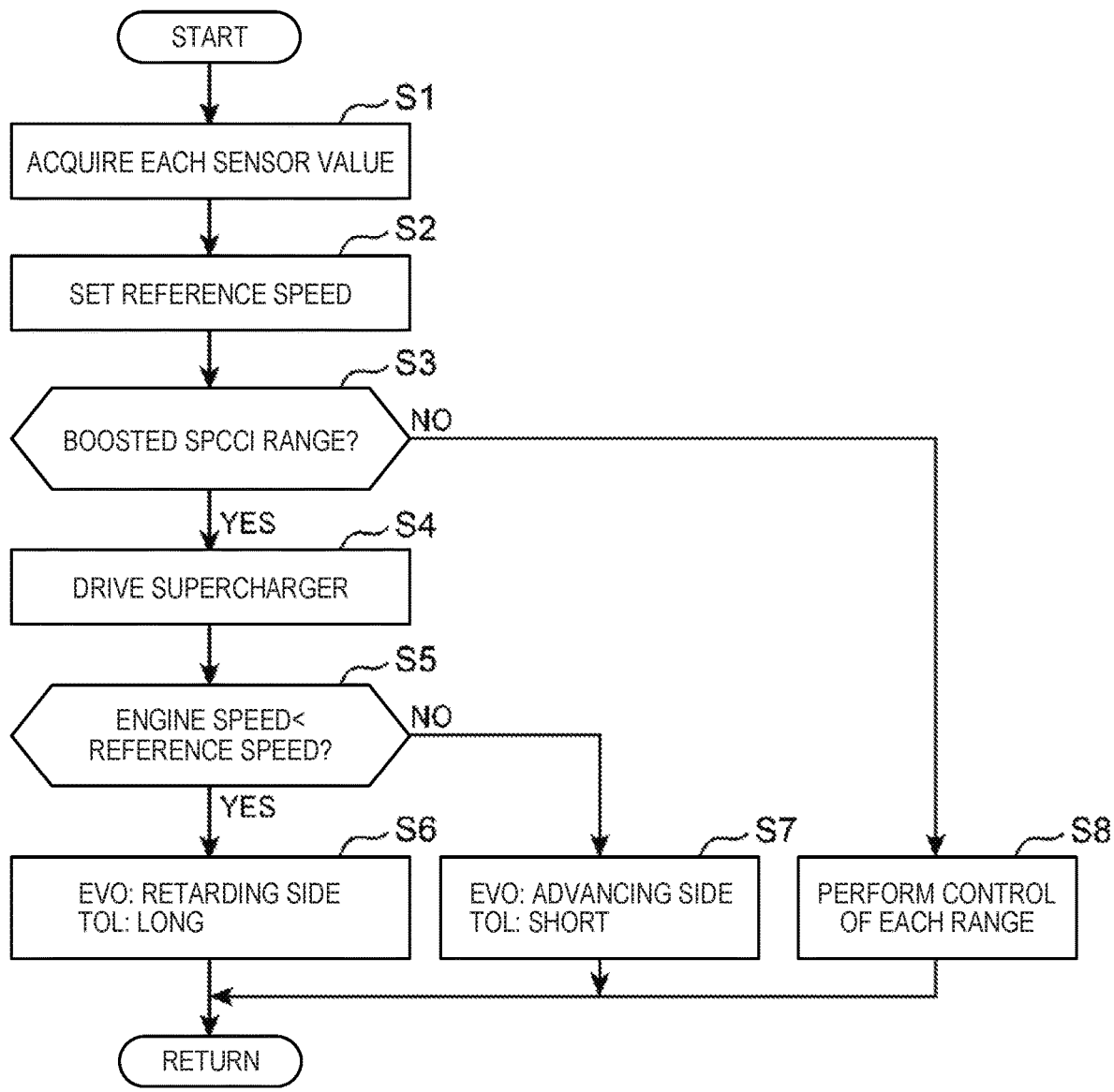
FIG. 11 is a flowchart illustrating a changing procedure of open and close timings of the intake valve and the exhaust valve in the boosted SPCCI range.

Summarizing a setting procedure of the open and close timings of the intake valve 11 and the exhaust valve 12 which are carried out in the boosted SPCCI range C described above, it will become like a flowchart of FIG. 11.

First, at Step S1, the ECU 100 acquires the detection values of the sensors SN1-SN8. Next, at Step S2, the ECU 100 sets the reference speed N1. As described above, the reference speed N1 is set higher as the wall temperature of the combustion chamber 6 increases, and at Step S2, the ECU 100 estimates the wall temperature of the combustion chamber 6 and sets the reference speed N1 based on the estimated wall temperature. In detail, the ECU 100 estimates, based on the engine water temperature detected by the engine water temperature sensor SN2 and the intake air temperature detected by the intake air temperature sensor SN5, the wall temperature of the combustion chamber 6 so that the value becomes higher as the engine water temperature and the intake air temperature increase, and in connection with this, the reference speed N1 is set as a higher value.

Next, at Step S3, the ECU 100 determines whether the engine is operated in the boosted SPCCI range C. In detail, the ECU 100 calculates the current engine load, i.e., required engine torque based on the opening of the accelerator pedal detected by the accelerator sensor SN8, the engine speed detected by the crank angle sensor SN1, etc. Then, the ECU 100 determines whether the current operation point is included in the boosted SPCCI range C based on the calculated engine load and the current engine speed detected by the crank angle sensor SN1.

If the determination at Step S3 is NO and the engine is not operated in the boosted SPCCI range C, the flow proceeds to Step S8. At Step S8, a control in ranges other than the boosted SPCCI range C is carried out. The details of Step S8 (description of the control of the open and close timings of the intake valve 11 and the exhaust valve 12 in ranges other than the boosted SPCCI range C) are omitted.

On the other hand, if the determination at Step S3 is YES and the engine is operated in the boosted SPCCI range C, the flow proceeds to Step S4. At Step S4, the ECU 100 drives the supercharger 33 (if it has already been driven, the driving state is maintained). After Step S4, the flow proceeds to Step S5, where it determines whether the engine speed is less than the reference speed N1.

If the determination at Step S5 is YES, the engine speed is lower than the reference speed N1, and the engine is operated in the low-speed boosted SPCCI range C_L, the flow proceeds to Step S6. At Step S6, the ECU 100 sets the open and close timings of the intake valve 11 and the exhaust valve 12 as the open and close timings set for the low-speed boosted SPCCI range C_L. That is, the ECU 100 sets the open and close timings of the intake valve 11 and the exhaust valve 12 so that the open timing EVO and the close timing EVC of the exhaust valve 12 are retarded, the open timing IVO and the close timing IVC of the intake valve 11 are advanced, and the valve overlap period TOL is extended.

On the other hand, if the determination at Step S5 is NO, the engine speed is greater than or equal to the reference speed N1, and the engine is operated in the high-speed boosted SPCCI range C_H, the flow proceeds to Step S7. At Step S7, the ECU 100 sets the open and close timings of the intake valve 11 and the exhaust valve 12 as the open and close timings set for the high-speed boosted SPCCI range C_H. In detail, the ECU 100 sets the open and close timings of the intake valve 11 and the exhaust valve 12 so that the open timing EVO and the close timing EVC of the exhaust valve 12 are more advanced than any of the timings in the low-speed boosted SPCCI range C_L, the open timing IVO and the close timing IVC of the intake valve 11 are more retarded than any of the timings in the low-speed boosted SPCCI range C_L, and the valve overlap period TOL is shorter than the period in the low-speed boosted SPCCI range C_L.

Here, Step S4 is an example of "driving the supercharger" in the present disclosure, Step S6 is an example of "driving the variable intake valve operating mechanism and the variable exhaust valve operating mechanism" in the present disclosure, and Step S7 is an example of "driving the variable exhaust valve operating mechanism" in the present disclosure.

(5) Operation, Etc.

Figure 12:
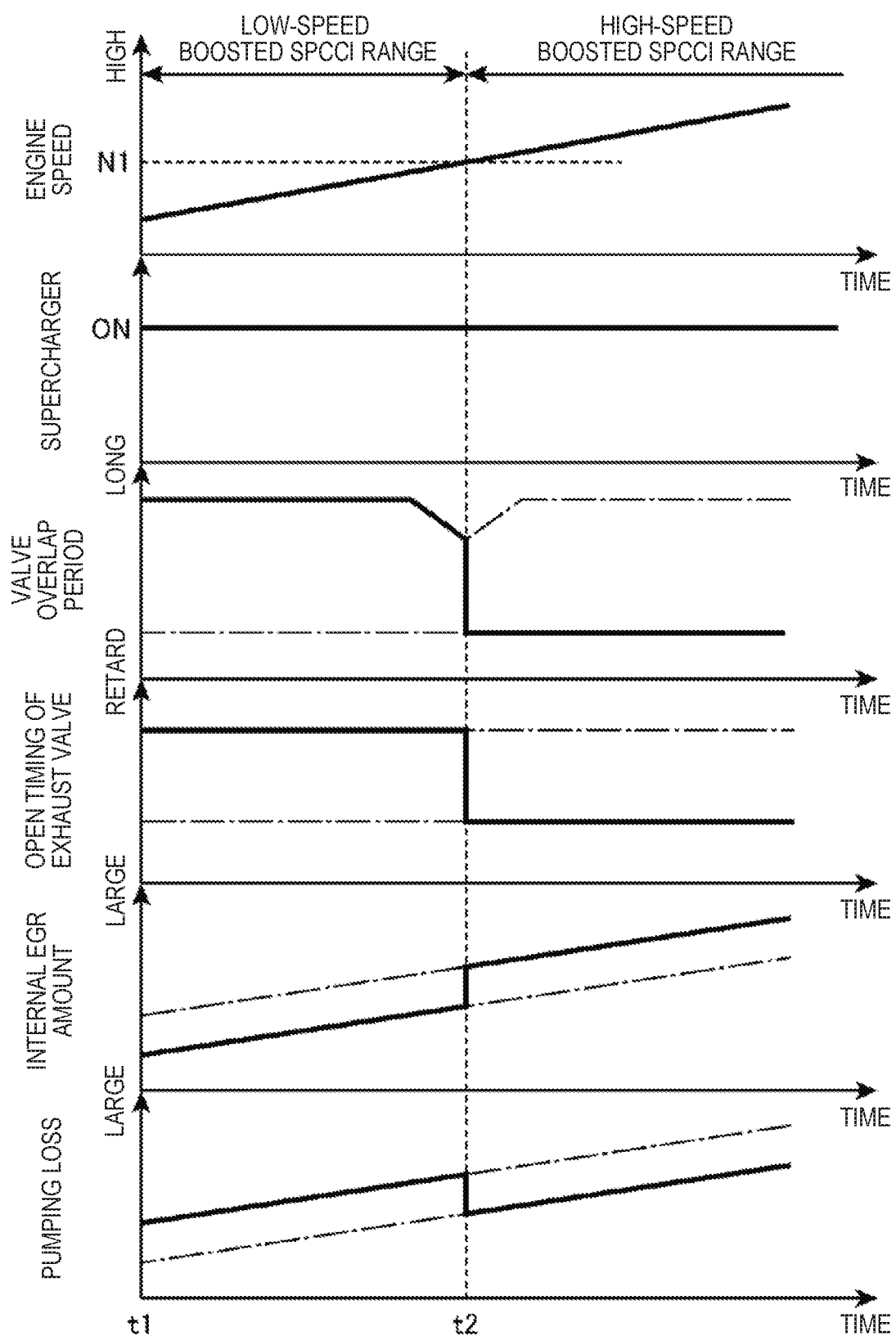
FIG. 12 is a view illustrating a temporal change in each parameter when the engine speed is increased.

FIG. 12 is a view illustrating a temporal change in each parameter when the engine is driven in the boosted SPCCI range C, and the engine speed is increased gradually while the engine load is maintained at a given load. The graphs in FIG. 12 indicate, from the top, the engine speed, the driving state of the supercharger 33, the valve overlap period, the open timing EVO of the exhaust valve 12, the internal EGR amount (amount of burnt gas which remains inside the combustion chamber 6), and the pumping loss. Note that the pumping loss illustrated in FIG. 12 is a work of the engine required for discharging burnt gas from the combustion chamber 6 to the exhaust passage 40. Moreover, a chain line in FIG. 12 indicates each parameter of a comparative example.

The engine speed is lower than the reference speed N1 from a time t1 to a time t2, and it corresponds to the low-speed boosted SPCCI range C_L (the engine operation point is included in the low-speed boosted SPCCI range C_L). On the other hand, after the time t2, the engine speed is greater than or equal to the reference speed N1, and it corresponds to the high-speed boosted SPCCI range C_H (the engine operation point is included in the high-speed boosted SPCCI range C_H). The chain line during the period from the time t1 to the time t2 in FIG. 12 indicates a change in each parameter if the open and close timings of the intake valve 11 and the exhaust valve 12 are set as the open and close timings for the high-speed boosted SPCCI range C_H. On the other hand, the chain line after the time t2 in FIG. 12 indicates a change in each parameter if the open and close timings of the intake valve 11 and the exhaust valve 12 are set as the open and close timings for the low-speed boosted SPCCI range C_L.

As described above, the graphs of FIG. 12 indicate the temporal changes in the respective parameters when the engine is operated in the boosted SPCCI range C, where the supercharger 33 is always driven.

During the period from the time t1 to the time t2, since the engine is operated in the low-speed boosted SPCCI range C_L, the valve overlap period is extended. Thus, by extending the valve overlap period while the supercharger 33 being driven, the internal EGR amount can be reduced from the time t1 to the time t2.

In detail, since the supercharger 33 is driven to boost the intake air, the pressure inside the intake passage 30 increases. When both the intake valve 11 and the exhaust valve 12 are opened over a long period of time while the pressure inside the intake passage 30 is high, a large amount of gas flows into the exhaust passage 40 through the combustion chamber 6 from the intake passage 30 side, and therefore, the scavenging performance can be increased. Thus, from the time t1 to the time t2, the internal EGR amount can be reduced by extending the valve overlap period while the supercharger 33 is driven. That is, the internal EGR amount can be reduced compared with the case where the valve overlap period is set as the short period for the high-speed boosted SPCCI range C_H (comparative example).

Particularly, in this embodiment, since the supercharger 33 is the mechanical supercharger rotary driven by the crankshaft 7, the pressure inside the intake passage 30 is certainly increased more than the pressure inside the exhaust passage 40, and therefore, the scavenging performance is certainly improved. In detail, if the turbocharger, which has a turbine provided to the exhaust passage 40 and boosts intake air by the turbine being rotary driven by exhaust gas, is used, the pressure inside the intake passage 30 cannot be sufficiently increased with respect to the pressure inside the exhaust passage 40 because back pressure of the engine (i.e., the pressure inside the exhaust passage 40) is increased by the turbine. On the other hand, in this embodiment, since the supercharger 33 can be driven without increasing the pressure inside the exhaust passage 40, the pressure in the intake passage 30 can be made certainly higher than the pressure inside the exhaust passage 40.

However, since the engine is operated in the low-speed boosted SPCCI range C_L during the period from the time t1 to the time t2 (since the engine operation point is in the low-speed boosted SPCCI range C_L), the open timing EVO of the exhaust valve 12 is retarded. Therefore, the pumping loss increases (worsens) during the period from the time t1 to the time t2. In detail, the pumping loss increases compared with the case where the open timing EVO of the exhaust valve 12 is set as the timing on the advanced side for the high-speed boosted SPCCI range C_H (comparative example). That is, when the open timing EVO of the exhaust valve 12 occurs at a later timing, the period from the open timing EVO of the exhaust valve 12 to an exhaust top dead center becomes shorter, and therefore, the piston 5 must push out the exhaust gas to the exhaust passage 40 within this short period of time. Therefore, since the work of the piston 5 increases (the force of exhaust gas depressing the piston 5 increases), the pumping loss increases.

Note that since the period of time per unit crank angle becomes shorter as the engine speed increases, the valve overlap period of time becomes shorter, even if the valve overlap period (crank angle) stays the same. Similarly, the period of time during which the exhaust valve 12 is opened becomes shorter as the engine speed increases, even if the open timing EVO of the exhaust valve 12 is the same. Therefore, as illustrated in FIG. 12, the internal EGR amount and the pumping loss increases the time passes from the time t1 and the engine speed increases.

After the time t2, since the engine is operated in the high-speed boosted SPCCI range C_H (since the engine operation point is within the high-speed boosted SPCCI range C_H), the open timing EVO of the exhaust valve 12 is set as the timing on the advancing side. When the open timing EVO of the exhaust valve 12 is advanced, the period of time from the open timing EVO of the exhaust valve 12 to a top dead center becomes longer. Therefore, the pumping loss decreases after the time t2. In detail, the pumping loss becomes less than the case where the open timing EVO of the exhaust valve 12 is set as the timing on the retarded side for the low-speed boosted SPCCI range C_L (comparative example).

On the other hand, after the time t2, the internal EGR amount increases because the valve overlap period becomes shorter. In detail, the internal EGR amount increases compared with the case where the valve overlap period is set as the long period for the low-speed boosted SPCCI range C_L (comparative example). Note that after the time t2, since the valve overlap is formed, the internal EGR amount can avoid becoming excessive because the scavenging performance is secured to some extent.

Note that after the time t2, similar to the above, the internal EGR amount and the pumping loss increases as the engine speed increases.

As described above, in this embodiment, when the engine is operated in the low-speed boosted SPCCI range C_L where the engine speed is lower than the reference speed N1 which is in the boosted SPCCI range C where the boost is performed by the supercharger 33, while the valve overlap is performed to form the valve overlap period during which both the intake valve 11 and the exhaust valve 12 open, the valve overlap period is further extended by the open timing EVO of the exhaust valve 12 being more retarded than when the engine is operated in the high-speed boosted SPCCI range C_H. Moreover, when the engine is operated in the high-speed boosted SPCCI range C_H where the engine speed is greater than or equal to the reference speed N1 which is in the boosted SPCCI range C, the open timing EVO of the exhaust valve 12 is more advanced than when the engine is operated in the low-speed boosted SPCCI range C_L.

Therefore, the pumping loss can be reduced and fuel efficiency can be improved, while preventing the premature ignition and appropriately combusting the mixture gas.

In detail, like the boosted SPCCI range C, in the range where the supercharger 33 is driven in order to introduce a large amount of air into the combustion chamber 6 and the engine load is high, the temperature of the combustion chamber 6 tends to be high because the combustion energy generated inside the combustion chamber 6 is high. Therefore, in this range, the temperature of the mixture gas may become excessively high during compression. When the temperature of the mixture gas becomes excessively high, a premature ignition, in which the mixture gas self-ignites at a timing earlier than a desired timing, may occur. Here, the mixture gas is easier to self-ignite as the period of time during which the temperature is high (i.e., heat-receiving time) becomes longer, and the premature ignition is easier to occur as the engine speed becomes lower and the period of time from the start of compression to the desired timing (in this embodiment, the ignition timing) becomes longer. Moreover, the temperature of the mixture gas is easier to become high and the premature ignition is easier to occur as the amount of internal EGR which is hot burnt gas increases.

On the other hand, in this embodiment, in the boosted SPCCI range C, particularly in the low-speed boosted SPCCI range C_L where the engine speed is low, and thereby the premature ignition is easier to occur, the valve overlap period is extended as described above. Therefore, the burnt gas which remains inside the combustion chamber 6 is fully scavenged to reduce the amount of internal EGR. Therefore, the premature ignition can be certainly prevented. Note that as described above, in the low-speed boosted SPCCI range C_L, since the amount of burnt gas to be scavenged increases by the open timing EVO of the exhaust valve 12 being retarded, the pumping loss increases. However, since the premature ignition can be prevented and the mixture gas can be combusted appropriately, it becomes possible to realize the increase in the compression ratio and the suitable SPCCI combustion. Therefore, it becomes possible to improve fuel efficiency by the improvement in the thermal efficiency which exceeds the influence of the pumping loss.

Further, in the boosted SPCCI range C, particularly in the high-speed boosted SPCCI range C_H where the engine speed is high, and therefore, the premature ignition is difficult to occur, while the open timing EVO of the exhaust valve 12 is advanced to reduce the pumping loss, exhaust efficiency is improved, which is resulting in reducing the burnt gas which remains inside the combustion chamber 6. Therefore, it becomes possible to increase the combustion stability, and in the entire boosted SPCCI range C, fuel efficiency can be improved without causing the premature ignition.

Moreover, the premature ignition is easier to occur as the temperature of the combustion chamber 6 becomes higher as described above, and the upper limit engine speed of the range where the premature ignition may occur becomes higher. On the other hand, in this embodiment, the reference speed N1 which is the upper limit engine speed of the low-speed boosted SPCCI range C_L becomes higher as the temperature of the combustion chamber 6 increases. Therefore, fuel efficiency can be improved without causing the premature ignition both when the temperature of the combustion chamber 6 is high and low.

Moreover, in this embodiment, the valve overlap is formed also in the high-speed boosted SPCCI range C_H. Therefore, in the high-speed boosted SPCCI range C_H, the burnt gas can be fully scavenged to secure the amount of fresh air introduced into the combustion chamber 6.

Moreover, in this embodiment, although the open timing EVO of the exhaust valve 12 is more advanced in the high-speed boosted SPCCI range C_H than in the low-speed boosted SPCCI range C_L, it is maintained constant in the high-speed boosted SPCCI range C_H regardless of the engine speed. Therefore, the opportunity for the variable exhaust valve operating mechanism 14a to change the open timing EVO of the exhaust valve 12 can be reduced. Moreover, the open timing EVO of the exhaust valve 12 can be prevented from being excessively advanced to secure the engine torque. That is, since the exhaust valve 12 can be prevented from opening at an excessively early timing in an expansion stroke, the combustion energy can be appropriately given to the piston 5 and the engine torque can be secured.

Moreover, in this embodiment, although the open timing EVO of the exhaust valve 12 is more retarded in the low-speed boosted SPCCI range C_L than in the high-speed boosted SPCCI range C_H, it is maintained constant in the low-speed boosted SPCCI range C_L regardless of the engine speed. Therefore, the opportunity for the variable exhaust valve operating mechanism 14a to change the open timing EVO of the exhaust valve 12 can be further reduced. Moreover, the open timing EVO of the exhaust valve 12 can avoid being excessively retarded to suppress the increase in the pumping loss.

(6) Modifications

Although in the above embodiment the mechanical supercharger which is rotary driven by the crankshaft 7 is used as the supercharger 33, the specific configuration of the supercharger 33 is not limited to this configuration. However, as described above, if the mechanical supercharger is used as the supercharger 33, since the pressure inside the intake passage 30 can be made certainly higher than the pressure inside the exhaust passage 40, compared with the case where a turbocharger is used, the scavenging performance is more certainly increased and, thereby, the premature ignition can be prevented more certainly.

In the above embodiment, although SPCCI combustion is carried out in the range where the boost is carried out by the supercharger 33, and where the valve overlap period is extended, and the open timing EVO of the exhaust valve 12 is retarded as the engine speed decreases (the open timing EVO of the exhaust valve 12 is more advanced as the engine speed increases), the combustion mode which is carried out in the range where the control described above is performed may be SI combustion or CI combustion, other than SPCCI combustion. Moreover, the control described above may be carried out throughout a partial range of the entire engine operating range where the engine load is greater than or equal to the second load T2. That is, the control described above is carried out in the boosted SPCCI range C and in the partial range of the fourth operating range D where the load is greater than or equal to the second load T2, and among these ranges, the open timing EVO of the exhaust valve 12 may be different from each other between in a range where the engine speed is less than the reference speed N1 and a range where the engine speed is greater than or equal to the reference speed N1.

Moreover, in the above embodiment, although in the boosted SPCCI range C, the intake valve 11 and the exhaust valve 12 are opened for the given period of time, ranging over an exhaust top dead center, the intake valve 11 and the exhaust valve 12 may be driven so that these valves are both opened only before the exhaust top dead center (i.e., in an exhaust stroke). Moreover, the intake valve 11 and the exhaust valve 12 may be driven so that both the valves may be opened only after an exhaust top dead center (i.e., in an intake stroke). However, since the volume of the combustion chamber 6 becomes the smallest at an exhaust top dead center, if gas flows toward the exhaust passage 40 from the intake passage 30 in this state, the burnt gas inside the combustion chamber 6 can be discharged to the exhaust passage 40 more effectively.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
2 Cylinder
6 Combustion Chamber
9 Intake Port
10 Exhaust Port
11 Intake Valve
12 Exhaust Valve
13a Variable Intake Valve Operating Mechanism
14a Variable Exhaust Valve Operating Mechanism
30 Intake Passage
33 Supercharger
40 Exhaust Passage
100 ECU (Controller)
C Boosted SPCCI Range (Boosted Range)
C_H High-speed Boosted SPCCI Range (High-speed Boosted Range)
C_L Low-speed Boosted SPCCI Range (Low-speed Boosted Range)

What is claimed is:

1. A control device for an engine provided with a cylinder, an intake passage, an exhaust passage, an intake port communicating the intake passage with the cylinder, an intake valve configured to open and close the intake port, an exhaust port communicating the exhaust passage with the cylinder, and an exhaust valve configured to open and close the exhaust port, the control device comprising:
    a variable intake valve operating mechanism configured to change an open timing and a close timing of the intake valve while maintaining an open period of the intake valve constant;
    a variable exhaust valve operating mechanism configured to change an open timing and a close timing of the exhaust valve while maintaining an open period of the exhaust valve constant;
    a supercharger provided to the intake passage and configured to boost intake air introduced into the cylinder; and
    a controller including a processor, configured to control the variable intake valve operating mechanism and the variable exhaust valve operating mechanism,
    wherein the controller drives the supercharger when an operation point of the engine is in a boosted range included in an operating range defined by a combination of an engine speed and an engine load,
    wherein the controller controls the variable intake valve operating mechanism and the variable exhaust valve operating mechanism so that a valve overlap period that is a period during which the intake valve and the exhaust valve open simultaneously is formed, when the operation point is in a low-speed boosted range of the boosted range where the engine speed is less than a reference speed,
    wherein the controller controls the variable exhaust valve operating mechanism so that the open timing of the exhaust valve is advanced more when the operation point is in a high-speed boosted range of the boosted range where the engine speed is greater than or equal to the reference speed, than when the operation point is in the low-speed boosted range, and
    wherein when the operation point is in the high-speed boosted range, the controller controls the variable exhaust valve operating mechanism so that the open timing of the exhaust valve is maintained constant even when the engine speed changes.

2. The control device of claim 1, wherein the supercharger is a mechanical supercharger configured to be driven by an output shaft of the engine and boost intake air.

3. The control device of claim 1, wherein when the operation point is in the high-speed boosted range, the controller controls the variable intake valve operating mechanism and the variable exhaust valve operating mechanism so that the valve overlap period is formed.

4. The control device of claim 1, wherein when the operation point is in the low-speed boosted range, the controller controls the variable exhaust valve operating mechanism so that the open timing of the exhaust valve is maintained constant even when the engine speed changes.

5. A method of controlling an engine provided with a cylinder, an intake passage, an exhaust passage, an intake port communicating the intake passage with the cylinder, an intake valve configured to open and close the intake port, an exhaust port communicating the exhaust passage with the cylinder, an exhaust valve configured to open and close the exhaust port, a variable intake valve operating mechanism configured to change an open timing and a close timing of the intake valve while maintaining an open period of the intake valve constant, a variable exhaust valve operating mechanism configured to change an open timing and a close timing of the exhaust valve while maintaining an open period of the exhaust valve constant, and a supercharger provided to the intake passage and configured to boost intake air introduced into the cylinder, the method comprising the steps of:
- driving the supercharger to boost intake air when an operation point of the engine is in a boosted range included in an operating range defined by a combination of an engine speed and an engine load;
- driving the variable intake valve operating mechanism and the variable exhaust valve operating mechanism so that a valve overlap period that is a period during which the intake valve and the exhaust valve open simultaneously is formed, when the operation point is in a low-speed boosted range of the boosted range where the engine speed is less than a reference speed; and
- driving the variable exhaust valve operating mechanism so that an open timing of the exhaust valve is advanced more when the operation point is in a high-speed boosted range of the boosted range where the engine speed is greater than or equal to the reference speed, than when the operation point is in the low-speed boosted range.

6. The method of claim 5, wherein the supercharger is a mechanical supercharger configured to be driven by an output shaft of the engine and boost intake air.

7. The method of claim 5, wherein driving the variable exhaust valve operating mechanism includes driving the variable exhaust valve operating mechanism so that the open timing of the exhaust valve is maintained constant even when the engine speed changes within a range where the engine speed is greater than or equal to the reference speed.

8. The method of claim 5, wherein driving the variable exhaust valve operating mechanism includes driving the variable intake valve operating mechanism and the variable exhaust valve operating mechanism so that the valve overlap period is formed.

9. The method of claim 5, wherein driving the variable intake valve operating mechanism and the variable exhaust valve operating mechanism includes driving the variable exhaust valve operating mechanism so that the open timing of the exhaust valve is maintained constant even when the engine speed changes within a range where the engine speed is less than the reference speed.

10. An engine controller configured to perform the steps of claim 5.

* * * * *